(12) United States Patent
Moscaluk

(10) Patent No.: US 7,671,664 B1
(45) Date of Patent: Mar. 2, 2010

(54) CHARGE PUMP CONTROL CIRCUIT AND METHOD

(75) Inventor: Gary Moscaluk, Colorado Springs, CO (US)

(73) Assignee: Cypress Semiconductor Corporaation, San Jose, CA (US)

( * ) Notice: Subject to any disclaimer, the term of this patent is extended or adjusted under 35 U.S.C. 154(b) by 133 days.

(21) Appl. No.: 11/801,543

(22) Filed: May 10, 2007

(51) Int. Cl.
 *G05F 1/10* (2006.01)
(52) U.S. Cl. .................. 327/536; 327/142; 327/291
(58) Field of Classification Search .......... 327/142, 327/198, 291, 295, 298, 299, 536; 363/59, 363/60
See application file for complete search history.

(56) References Cited

U.S. PATENT DOCUMENTS 6,768,366 B2 * 7/2004 Kuo et al. .................. 327/291

* cited by examiner

*Primary Examiner*—Long Nguyen

(57) ABSTRACT

A charge pump control circuit that four main parts: a clock control circuit; a clock switch and driver circuit; a pump stage; and a dynamic load control circuit. The clock control circuit has a dynamic load that is controlled by the dynamic load control circuit. When the charge pump control circuit is enabled, the dynamic capacitive load is applied which incorporates a delay allowing the high frequency clock to control the pump stage and quickly charge the output to the desired boosted voltage. This provides a very fast boosted output voltage during a startup condition. Once the desired output voltage is realized, the dynamic capacitive load is disabled and the low frequency clock takes over the operation. During each low frequency clock cycle, the high frequency clock is enabled for several cycles per cycle of the low frequency clock.

19 Claims, 4 Drawing Sheets

# CHARGE PUMP CONTROL CIRCUIT AND METHOD

RELATED APPLICATIONS

Not Applicable

STATEMENT REGARDING FEDERALLY SPONSORED RESEARCH

Not Applicable

THE NAMES OF THE PARTIES TO A JOINT RESEARCH AGREEMENT

Not Applicable

REFERENCE TO A SEQUENCE LISTING, A TABLE, OR A COMPUTER PROGRAM LISTING

Not Applicable

BACKGROUND OF THE INVENTION

Charge pumps are used to provide boosted voltages above the power supply voltage in electronic circuits. Today's mobile electronic products require low power consumption and fast startup times. For charge pump circuits this means that they need the desired boosted pump voltage quickly, and once stable consume as little power, or current, as possible. A conventional charge pump control circuit generates a high frequency and low frequency oscillator and uses circuitry to control the clock switching. During startup, the high frequency clock is used to generate the desired high output voltage at which point, the low frequency clock will take over the pump operation. The main disadvantage of using this approach is in order to maintain the minimum positive pump voltage, the frequency of the low frequency oscillator must be increased which increases operating power consumption. One solution is to add filter capacitance to the output which will keep the charge longer; however, this will contribute to a much longer startup time.

Thus there exists a need for a fast startup charge pump control system that consumes as little power during operation as possible.

BRIEF SUMMARY OF INVENTION

A charge pump control circuit that overcomes these and other problems has four main parts: a clock control circuit; a clock switch and driver circuit; a pump stage; and a dynamic load control circuit. When the charge pump control circuit is enabled, the dynamic capacitive load is applied which incorporates a delay allowing the high frequency clock to control the pump stage and quickly charge the output to the desired boosted voltage. This provides a very fast boosted output voltage during a startup condition. Once the desired output voltage is realized, the dynamic capacitive load is disabled and the low frequency clock takes over the operation. During each low frequency clock cycle, the output voltage discharge rate is a function of the load capacitance and load current (if applicable) which it is driving. Therefore, in order to quickly boost the output back to its desired voltage the high frequency clock is enabled for several cycles per cycle of the low frequency clock. This reduces the power consumed compared to running a low frequency clock at a faster speed. Thus the charge pump circuit provides a fast startup with minimal power consumption under operating conditions.

DETAILED DESCRIPTION OF THE INVENTION

A charge pump control circuit has four main parts: a clock control circuit; a clock switch and driver circuit; a pump stage; and a dynamic load control circuit. The clock control circuit has a dynamic load that is controlled by the dynamic load control circuit. When the charge pump control circuit is enabled, the dynamic capacitive load is applied which incorporates a delay allowing the high frequency clock to control the pump stage and quickly charge the output to the desired boosted voltage. This provides a very fast boosted output voltage during a startup condition. Once the desired output voltage is realized, the dynamic capacitive load is disabled and the low frequency clock takes over the operation. During each low frequency clock cycle, the output voltage discharge rate is a function of the load capacitance and load current (if applicable) which it is driving. Therefore, in order to quickly boost the output back to its desired voltage the high frequency clock is enabled for several cycles per cycle of the low frequency clock. This reduces the power consumed compared to running a low frequency clock at a faster speed. Thus the charge pump circuit provides a fast startup with minimal power consumption under operating conditions.

Figure 1:
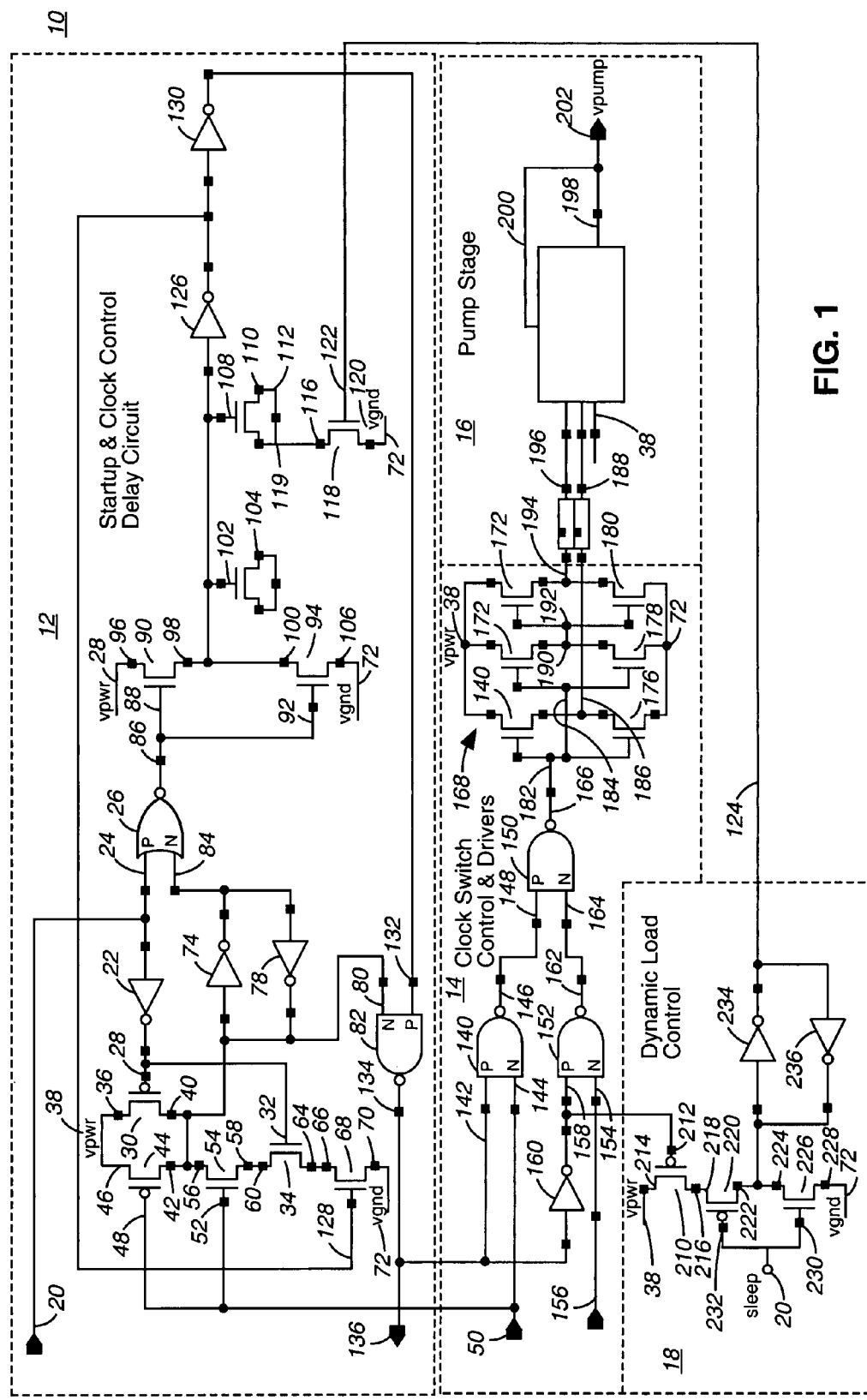
FIG. 1 is a schematic diagram of the charge pump control circuit in accordance with one embodiment of the invention.

FIG. 1 is a schematic diagram of the charge pump control circuit 10 in accordance with one embodiment of the invention. The charge pump control circuit 10 is made of four major parts: the clock control circuit 12; the clock switch control circuit 14; the pump stage 16; and the dynamic load control 18. The clock control circuit 12 has a sleep input 20 coupled to an inverter 22 and to an input 24 of a NOR gate 26. The output of the inverter is coupled to the gate 28 of a PMOS transistor 30 and the gate 32 of NMOS transistor 34. The source 36 of transistor 30 is coupled to the power supply (Vpwr) 38. The drain 40 of transistor 30 is coupled to the drain 42 of PMOS transistor 44. The source 46 of transistor 44 is coupled to power supply 38. The gate 48 of transistor 44 is coupled to the low frequency clock (slowclk) 50 and to the gate 52 of NMOS transistor 54. The drain 56 of transistor 54 is coupled to the drain 42 of transistor 44. The source 58 of transistor 54 is coupled to the drain 60 of transistor 34. The source 64 of transistor 34 is coupled to the drain 66 of NMOS transistor 68. The drain 70 of transistor 68 is coupled to ground (Vgnd) 72. The drain 40 of transistor 30 is also coupled to the input of inverter 74 and the output of the inverter 76 and an input 80 of the NAND gate 82. The output of inverter 74 and the input of inverter 76 are coupled to an input 84 of NOR gate 26. The output 86 NOR gate 26 is coupled to the gate 88 of PMOS transistor 90 and the gate 92 of NMOS transistor 94. The source 96 of transistor 90 is coupled to the power supply 28. The drain 98 of transistor 90 is coupled to the drain 100 of transistor 94 and to the gate 102 of capacitor coupled transistor 104. The source 106 of transistor 94 is coupled to ground 72. The gate 102 of capacitor coupled transistor 104 is coupled to the gate 108 of capacitor coupled transistor 110. The source 112 and drain 114 of capacitor coupled transistor 110 are coupled to the drain 116 of NMOS transistor 118. The source 120 of transistor 118 is coupled to ground 72. The gate 122 of transistor 118 is coupled to a startup signal 124 from the dynamic load control circuit 18. The gate 108 of capacitor coupled transistor 110 is coupled to the input of inverter 126. The output of inverter 126 is coupled to the gate 128 of transistor 68 and to the input of inverter 130. The output of inverter 130 is coupled to an input 132 of NAND gate 82. The output 134 of NAND gate 82 forms the switch clock signal 136.

The clock switch control circuit 14 has a NAND gate 140 with a first input 142 coupled to the switch clock signal 136 and a second input 144 coupled to the low frequency clock signal 50. The output 146 of NAND gate 140 is coupled to an input 148 of NAND gate 150. Another NAND gate 152 has a first input 154 coupled to a high frequency clock signal 156. The second input 158 of NAND gate 152 is coupled to the output of an inverter 160. The input of the inverter 160 is coupled to the switch clock signal 136. The output 162 of NAND gate 152 is coupled to an input 164 of NAND gate 150. The output 166 of NAND gate 150 forms the clock signal. The clock signal 166 forms the input to the clock driver section 168 which is formed by three inverters. The PMOS transistors 170, 172, 174 of the three inverters have their gates coupled to the power supply voltage 38 and their drains coupled to the drains of the three NMOS transistor 176, 178, 180 of the three inverters. The sources of the NMOS transistor 176, 178, 180 are coupled to ground 72. Note that the input 182 of the first inverter is coupled to the input 184 of the second inverter. The output 186 of the first inverter forms the output signal 188. The output 190 of the second inverter is coupled to the input 192 of the third inverter. The output 194 of the third inverter forms the output-bar (outb) signal 196.

The pump stage 16 has the output signal 188 and output bar signal 196, or differential output cock signal and the power supply 38 and input signals. The output 198 is coupled 200 to the pump stage input, VPOS, and forms the pump signal (Vpump) 202. The VPOS is an input to the pump stage which connects to the isolated Nwell of the circuit preventing any forward biasing conditions of parasitic bipolars. Since the output voltage is the highest potential during operation, it must control the Nwell for the pump stage.

The dynamic load control circuit 18 has a PMOS transistor 210 with a gate 212 coupled to the inverter switch clock signal. The source 214 of transistor 210 is coupled to power supply 38. The drain 216 of transistor 210 is coupled to the source 218 of PMOS transistor 220. The source 222 of transistor 220 is coupled to the drain 224 of NMOS transistor 226. The drain 228 of transistor 226 is coupled to ground 72. The gate 230 of transistor 226 and the gate 232 of transistor 220 are coupled to the sleep signal 20. The source 224 of transistor 226 is coupled to the input of inverter 234 and to the output of inverter 236. The output of inverter 234 and input of inverter 236 form the startup signal 124.

The startup and clock delay circuit 12 control the startup operation once enabled 20 for a very fast boosted output voltage as well as controlling the pump operation during stable operation. The dynamic load control circuitry 18 functions by adding a very large capacitor 110 during startup to allow for enough time for the output 202 to reach its desired voltage. Once the voltage is maintained, the capacitor 202 is removed for proper functionality during stable operation. The clock switch control 14 and drivers controls 168 whether the low 50 or high frequency 156 clock drives the pump stage 16 as well as generate true 188 and complement 196 clocks for the pump stage 16. The pump stage 16 consists of two boosting capacitors and pump control circuitry which generates the desired positive pump voltage 202.

During standby or sleep condition, the output 202 is at ground and no current consumption takes place. Once enabled, the high frequency 156 oscillator starts and transitions to the clock drivers 108 which quickly boosts the output 202 to its stable voltage. At the same time, the startup and clock control delay circuit 12 will provide a delayed signal which coincides with the output 202 reaching its stable voltage and essentially turns off the high frequency oscillator 156 and turns on the low frequency oscillator 50. At this point in time, the clock switch control and drivers 14 allow the low frequency oscillator 50 to transition to the pump stage 16. On the falling edge of the low frequency oscillator clock 50, the latch of the startup and clock control block 12 will essentially turn on the high frequency oscillator clock 156 and control the pumping operation until the delayed signal is realized and the high frequency oscillator 156 is disabled. This delayed signal will also generate a feedback signal 128 to the latch which will reset the clock control delay circuit 12 and prepare it for the next falling edge of the low frequency clock 50. This operation basically allows the high frequency oscillator 156 to control the boosting of the output 202 for several cycles every falling edge of the low frequency oscillator clock 50 which quickly pumps up the voltage to its maximum desired voltage. This does two things: One, it allows for a lower frequency oscillator 50 which constitutes lower power consumption. Two, no additional filter capacitance is needed with no detrimental affect on startup time.

Figure 2:
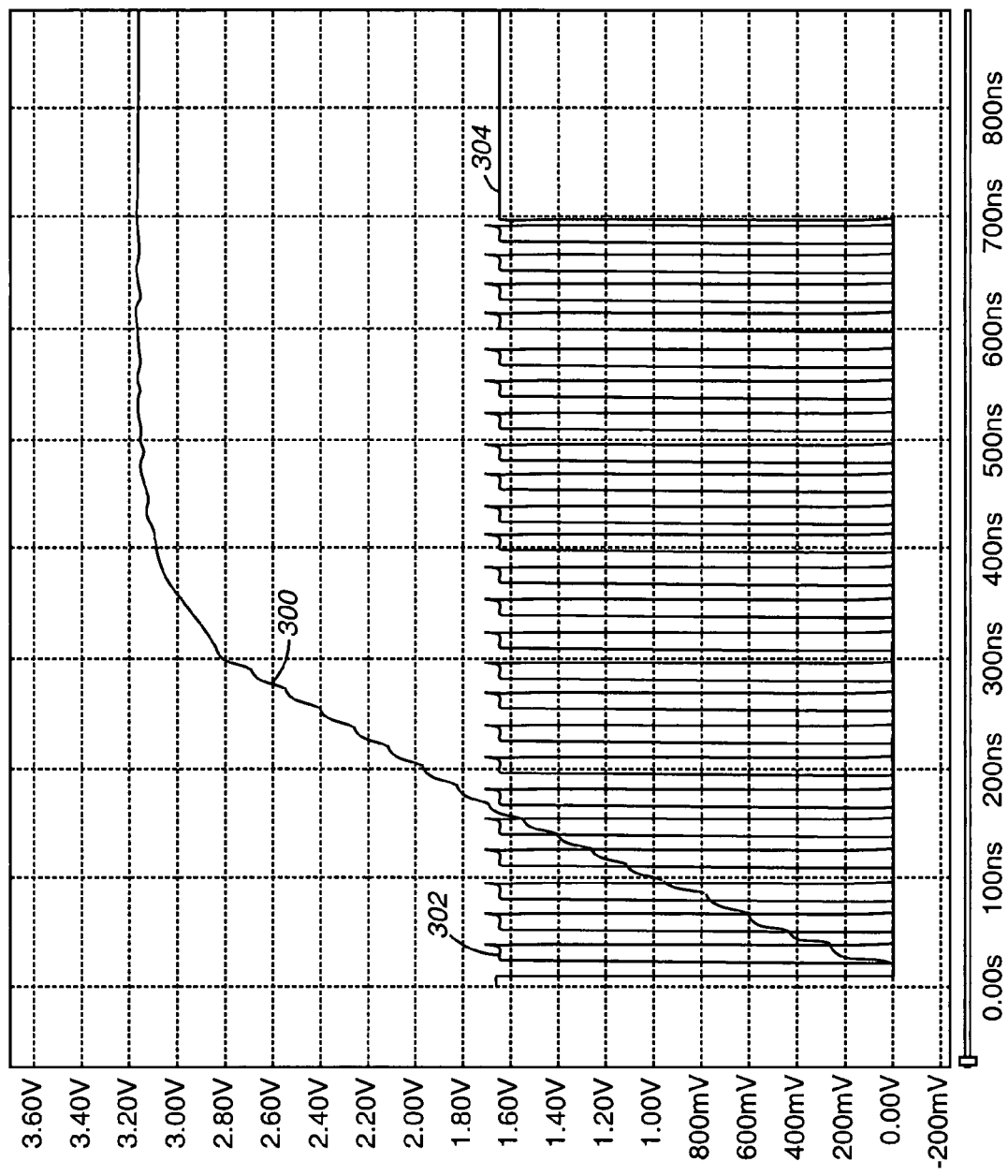
FIG. 2 is a graph of the startup operation of the charge pump control circuit in accordance with one embodiment of the invention.

FIG. 2 is a graph of the startup operation of the charge pump control circuit in accordance with one embodiment of the invention. The output voltage is curve 300 and increases from 0 volts to 3.2 volts over 700 nanoseconds. The high frequency clock curve 302 is on from start-up to 700 nanoseconds. Curve 304 is the switch clock signal which rises at 700 nanoseconds after startup to turn off the high frequency clock and turn on the low frequency clock.

Figure 3:
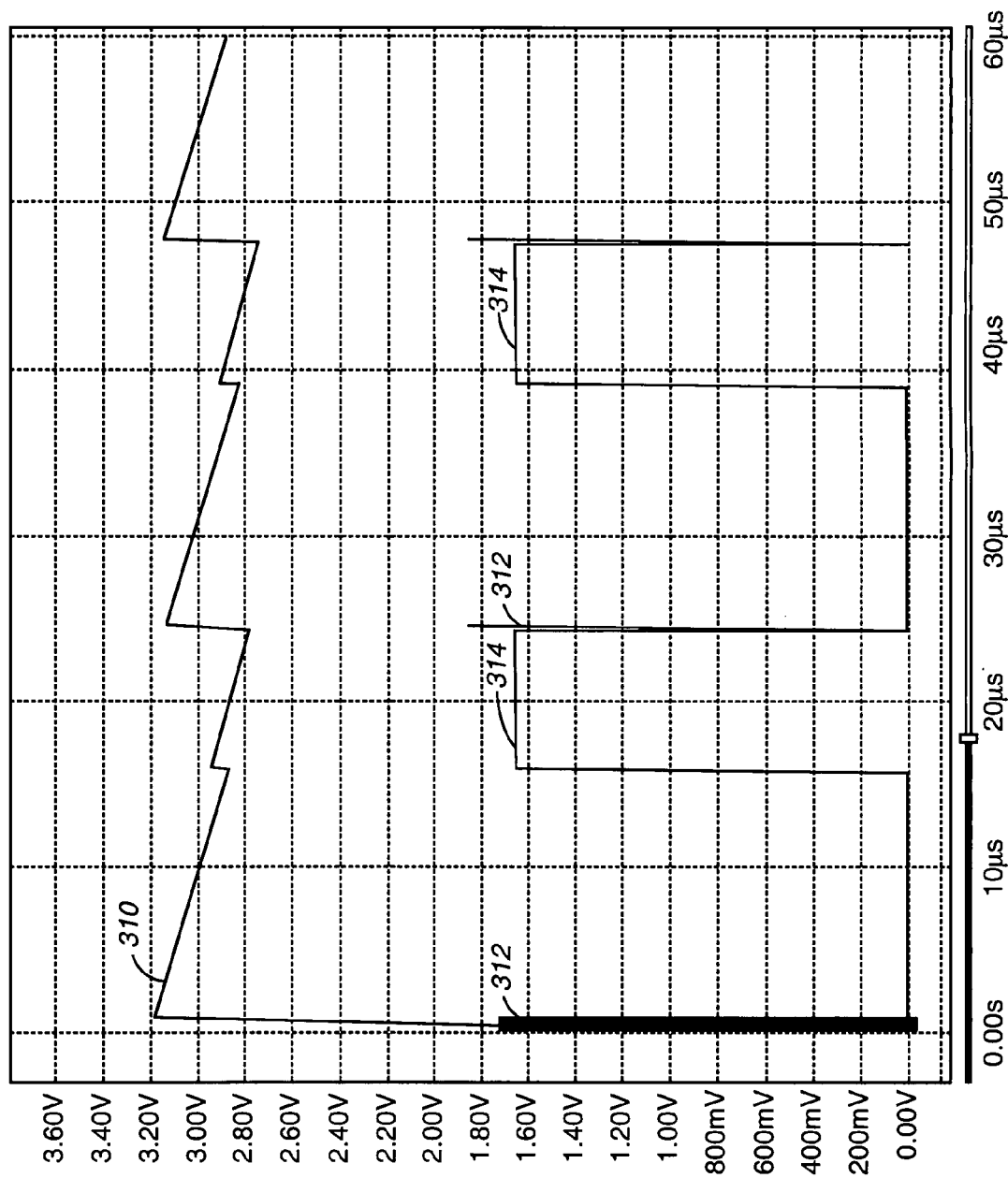
FIG. 3 is a graph of the operation of the charge pump control circuit in accordance with one embodiment of the invention.

FIG. 3 is a graph of the operation of the charge pump control circuit in accordance with one embodiment of the invention. The output pump voltage signal is curve 310, which rises steeply at startup and then forms a sawtooth type waveform. The high frequency clock 312 is applied at startup and at the falling edge of the low frequency clock 314.

Figure 4:
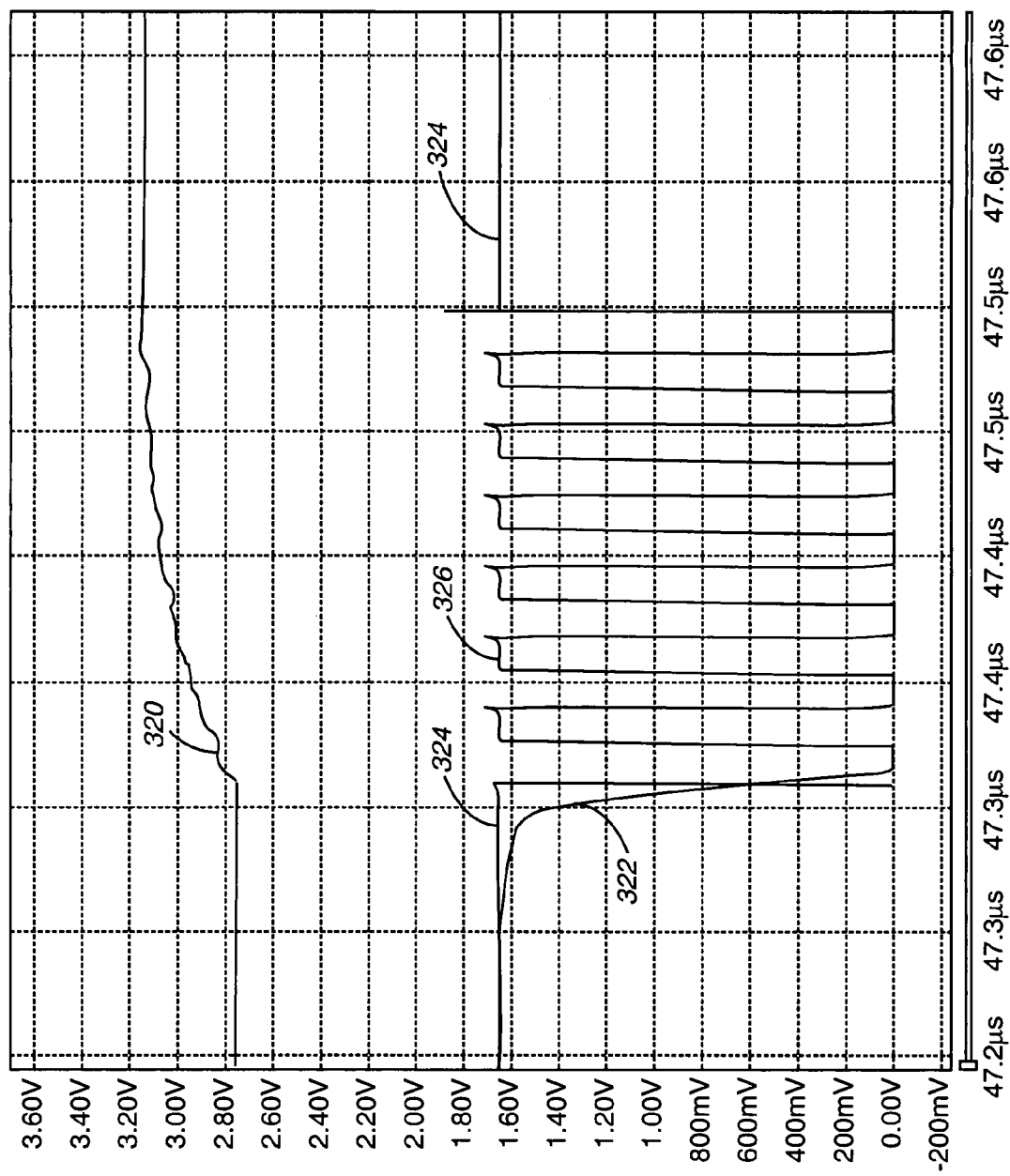
FIG. 4 is an expanded graph of the operation of the charge pump control circuit during a falling edge of the low frequency clock in accordance with one embodiment of the invention.

FIG. 4 is an expanded graph of the operation of the charge pump control circuit during a falling edge of the low frequency clock in accordance with one embodiment of the invention. Curve 320 shows the output voltage versus time. Curve 322 is falling edge of the low frequency clock. Curve 324 is the switch clock signal which turns on and off the high frequency clock 326. Note that the high frequency clock 326 is on for about 200 nanoseconds.

Thus there has been described a charge pump control circuit which provides a fast startup with minimal power consumption under operating conditions. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A charge pump control circuit, comprising:
   a clock control circuit configured to output a switch clock control signal based on a dynamic load; and
   a clock driver circuit configured to switch a clock signal supplied to a charge pump circuit between one of a first clock signal and a second clock signal based on the switch clock control signal, wherein the first clock signal has a higher frequency than the second clock signal.

2. The circuit of claim 1, further including a dynamic load control circuit having a startup signal controlling the dynamic load.

3. The circuit of claim 2, wherein the dynamic load has a capacitor with a node coupled to a controllable switch.

4. The circuit of claim 3, wherein the capacitor is a transistor with a source coupled to a drain of the transistor.

5. The circuit of claim 1 wherein the clock switch control circuit has a low frequency clock input and a high frequency clock input.

6. The circuit of claim 2, wherein the dynamic load control circuit is coupled to the switch clock signal output.

7. A method of operating a charge pump control circuit, comprising:
   a) determining if a start-up condition exists;
   b) when the start-up condition exists, applying a high frequency clock to a pump stage;
   c) determining if a start-up delay has expired;
   d) when the start-up delay has expired, applying a low frequency clock to the pump stage.

8. The method of claim 7, further including the steps of:
   e) not applying the high frequency clock to the pump stage.

9. The method of claim 8, further including the steps of:
   f) determining if the low frequency clock has a falling edge;
   g) when the low frequency clock has the falling edge, applying the high frequency clock to the pump stage.

10. The method of claim 9, further including the steps of:
    h) waiting an operational delay and not applying the high frequency clock to the pump stage.

11. The method of claim 7, further including the steps of:
    e) when the start-up condition does not exists, determining if the low frequency clock has a falling edge;
    f) when the low frequency clock does not have the falling, applying the low frequency clock to the pump stage.

12. The method of claim 11, further including the steps of:
    g) when the low frequency clock does have the falling, applying the high frequency clock to the pump stage.

13. The method of claim 9, further including the steps of:
    h) when the low frequency clock does not have the falling applying the low frequency clock to the pump stage.

14. The method of claim 10, further including the steps of:
    i) applying the low frequency clock to the pump stage.

15. A charge pump control circuit comprising:
    a clock control circuit with a dynamic load, wherein the clock control circuit is configured to output a switch clock signal after a delay following enabling the charge pump control circuit, wherein the duration of the delay is based on the dynamic load; and
    a clock switch circuit configured to receive the switch clock signal from the clock control circuit, wherein the clock switch circuit switches a frequency of a clock signal supplied to a charge pump circuit in response to the switch clock signal.

16. The charge pump control circuit of claim 15, further comprising a dynamic load control circuit having a startup signal that controls the dynamic load.

17. The control circuit of claim 16, further including a clock driver receiving a clock signal from the clock switch circuit and having a differential clock output.

18. The control circuit of claim 15, wherein the clock switch circuit receives a low frequency clock input.

19. The control circuit of claim 18, wherein the clock switch circuit receives a high frequency clock input.

* * * * *